United States Patent
Mörsch

(10) Patent No.: US 7,215,390 B2
(45) Date of Patent: May 8, 2007

(54) BACK-LIT LIQUID CRYSTAL DISPLAY, IN PARTICULAR FOR USE AS A DISPLAY MODULE BEHIND THE OPERATING PANEL OF A LARGE DOMESTIC APPLIANCE

(75) Inventor: Norbert Mörsch, Wangen (DE)

(73) Assignee: Diehl AKO Stiftung & Co. KG, Wangen (DE)

( * ) Notice: Subject to any disclaimer, the term of this patent is extended or adjusted under 35 U.S.C. 154(b) by 328 days.

(21) Appl. No.: 10/999,439

(22) Filed: Nov. 29, 2004

(65) Prior Publication Data

US 2005/0073628 A1    Apr. 7, 2005

Related U.S. Application Data

(63) Continuation of application No. PCT/EP03/07205, filed on Jul. 5, 2003.

(30) Foreign Application Priority Data

Jul. 11, 2002   (DE) ................ 202 10 707 U

(51) Int. Cl.
  *G02F 1/1333*   (2006.01)
  *G02F 1/1335*   (2006.01)
(52) U.S. Cl. .................. 349/67; 349/58; 349/60
(58) Field of Classification Search ............... 349/58, 349/60, 67
  See application file for complete search history.

(56) References Cited

U.S. PATENT DOCUMENTS 4,914,553 A    4/1990 Hamada et al.
6,034,757 A *  3/2000 Yanagawa et al. .......... 349/141
6,523,966 B1   2/2003 Satoh et al.
2002/0105605 A1* 8/2002 Huang et al. ............... 349/58
2003/0058380 A1* 3/2003 Kim et al. .................. 349/58

FOREIGN PATENT DOCUMENTS

DE    35 26 511 C2    2/1988
EP    1 039 216 A1    9/2000
WO    99/53735        10/1999

OTHER PUBLICATIONS

Trueson, Patrick: "LED steht Kopf" [LED On It's Head], Design & Electronik, Jun. 2002 pp. 25-27.

* cited by examiner

*Primary Examiner*—Huyen Ngo
(74) *Attorney, Agent, or Firm*—Laurence A. Greenberg; Werner H. Stemer; Ralph E. Locher

(57) ABSTRACT

A module of a back-lit liquid crystal display, as is used in particular in the operating panel of a large domestic appliance, is simple from a production procedure point of view, and is spatially compact and has close tolerances in regard to the installation dimensions. Further the module has good illumination of a transmissive liquid crystal cell, when a light guide panel is disposed in a trough-shaped reflector member and the liquid crystal cell is disposed at a small spacing relative to the coupling-out surface of the panel on the side walls of the trough-shaped member. A frame engages over the configuration in a cover-like manner and determines a height of the module in regard to its positively locking anchorage in the circuit board on which the trough-shaped reflector member then resiliently rests.

10 Claims, 2 Drawing Sheets

BACK-LIT LIQUID CRYSTAL DISPLAY, IN PARTICULAR FOR USE AS A DISPLAY MODULE BEHIND THE OPERATING PANEL OF A LARGE DOMESTIC APPLIANCE

CROSS-REFERENCE TO RELATED APPLICATION

This is a continuing application, under 35 U.S.C. § 120, of copending international application No. PCT/EP2003/007205, filed Jul. 5, 2003, which designated the United States; this application also claims the priority, under 35 U.S.C. § 119, of German patent application No. 202 10 707.8, filed Jul. 11, 2002; the prior applications are herewith incorporated by reference in their entirety.

BACKGROUND OF THE INVENTION

Field of the Invention

The invention concerns a back-lit liquid crystal display containing a light-guide panel which has light passing therethrough on to the display transversely with respect to the viewing direction. The light-guide panel is under a liquid crystal cell which is disposed under a frame and which is electrically and mechanically connected to a circuit board. A trough-shaped reflector member accommodates the light-guide panel in itself and which is at a small spacing above the light-guide panel that carries the liquid crystal cell. A light source is electrically and mechanically connected to conductor tracks of the circuit board and radiates light laterally into the light-guide panel.

Such a light display is known in particular for cellular telephones from Published, European Patent Application EP 1 039 216 A1 corresponding to U.S. Pat. No. 6,523,966 B1. In that case a box-shaped trough member rests on a side, which is provided with conductor tracks, of a circuit board that on that conductor track-bearing side is also provided with a multi-color light source that radiates light laterally into the trough member. Resting on the bottom of the trough member is a light-guide panel into which the light radiation is deflected in order thereafter to issue transversely with respect thereto through a liquid crystal cell that rests on the light-guide panel. Disposed on the free end edge of the trough member is a frame which projects above the side edge of the liquid crystal cell and which on the other hand bears behind a viewing opening against a front wall of a housing. By virtue of that configuration, the spacing between that installation position and the circuit board is dependent on the tolerances of numerous components of such a modular structure, and that causes difficulty in terms of installation factors. In addition there is the disadvantage from the production engineering point of view that the light source and the trough member for accommodating the light-guide panel together with the liquid crystal cell are disposed on the side of the circuit board which is provided with conductor tracks and which therefore is to be soldered.

A liquid crystal display of a similar structure is diagrammatically shown in German Patent DE 35 26 511 C1, corresponding to U.S. Pat. No. 4,914,553. In this case also a liquid crystal cell is backed by a light-guide panel into which light is irradiated from a narrow side into the light-guide panel substantially parallel to the main plane thereof. The light-guide panel which however is wedge-shaped there in Longitudinal section is of a stepped configuration at its rear side which is remote from the liquid crystal cell, so that light is coupled out, at the step edges, through the thickness of the panel, into the liquid crystal display, in opposite relationship to the viewing or observation direction thereof. As a consequence of the discrete step geometry at the rear side of the light-guide panel however, in spite of the wedge shape thereof, it is not possible to reckon on light shining through the transmissive liquid crystal cell in a sufficiently homogeneous condition, and the sudden changes in brightness which occur between the steps in the light-guide panel in addition also make it difficult to read off an alphanumeric representation of information. That prior publication also does not specify how a compact modular structure that is also production-friendly in regard to inevitable component tolerances could be specifically configured for the display with the inclusion of the actuating circuit for its liquid crystal cell.

International Patent Disclosure WO 99/53735 also discloses a liquid crystal display with a light-guide element back-lighting a liquid crystal cell. In that case the light-guide element rests with its underside having a light-reflecting layer, directly on a circuit board. The light-guide element is of a trough-shaped configuration and carries or encloses the liquid crystal cell, wherein a cover-shaped frame engages over the light-guide element together with the liquid crystal cell and holds it on the circuit board. The trough-shaped configuration of the light-guide element provides that light is passed not only through the liquid crystal cell but also is taken past it, which gives rise to unwanted scatter light. In addition the structure is highly sensitive to production tolerances so that this configuration requires an increased level of expenditure in terms of production engineering.

SUMMARY OF THE INVENTION

It is accordingly an object of the invention to provide a back-lit liquid crystal display, in particular for use as a display module behind the operating panel of a large domestic appliance that overcomes the above-mentioned disadvantages of the prior art devices of this general type. The technical object of the invention is to configure a liquid crystal display in such a way that—without necessitating expensive assembly requirements—the liquid crystal display is suitable in particular for use in the operating panel of a large domestic appliance, by virtue of a compact and tolerance-resistant flat module structure.

With the foregoing and other objects in view there is provided, in accordance with the invention, a back-lit liquid crystal display. The display contains a frame having spring noses, a circuit board having conductor tracks, and a liquid crystal cell disposed under the frame and electrically and mechanically connected to the circuit board. A light-guide panel, having a light passing there-through transversely with respect to a viewing direction, is disposed under the liquid crystal cell. A trough-shaped reflector member accommodates the light-guide panel and at a small spacing above the light-guide panel carries the liquid crystal cell. The trough-shaped reflector member has a bottom with a slot-shaped aperture. A light source is electrically and mechanically connected to the conductor tracks of the circuit board and radiates the light laterally into the light-guide panel. The frame, the circuit board, the liquid crystal cell, the light-guide panel, the light source, and the trough-shaped reflector member form a modular structure defining a display module for use behind an operating panel of a domestic appliance. The trough-shaped reflector member rests in an elastically supported relationship on the circuit board. The frame is a cover-shaped frame and determines a structural height of the display module. The light-guide panel has an angularly extending limb engaging into the slot-shaped aperture. The circuit board has at least one aperture formed beneath the slot-shaped aperture. The light source is disposed in or under the aperture and radiates the light into the angularly extending limb. The light source is connected to the conductor tracks on a rear side of the circuit board, remote from the frame. The frame is rigidly latched with the spring noses in opposite relationship to elastic support of the trough-shaped reflector member.

In accordance with the present invention, the object is attained in that there is implemented a sandwich structure containing the prefabricated individual parts which, as stated there, can be latched to each other or which rest one within the other.

In accordance with the present invention, the object is attained in that there is implemented a sandwich structure containing the prefabricated individual parts which, as stated there, can be latched to each other or which rest one within the other.

Other features which are considered as characteristic for the invention are set forth in the appended claims.

Although the invention is illustrated and described herein as embodied in a back-lit liquid crystal display, in particular for use as a display module behind the operating panel of a large domestic appliance, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
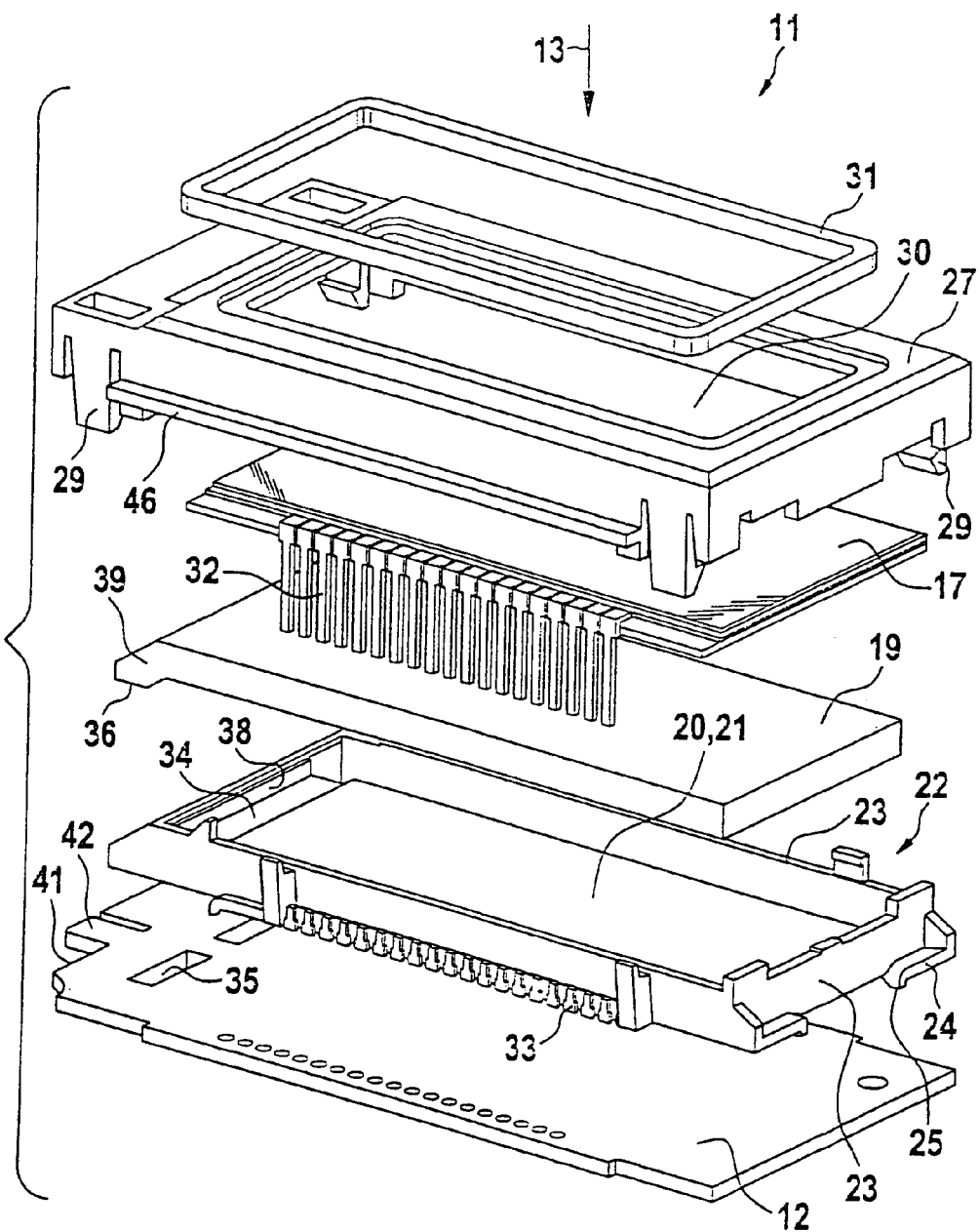
FIG. 1 is a diagrammatic, exploded perspective view of elements of a sandwich structure configured in accordance with the invention in the assembly sequence in a mutually superposed spaced relationship of a liquid crystal display module.

Referring now to the figures of the drawing in detail and first, particularly, to FIG. 1 thereof, there is shown a basis for a sandwich structure of a liquid crystal display which is back-lit according to the invention, as a display module 11, on a circuit board 12. The circuit board 12 has at least on its rear side 14 which is remote from a viewing direction 13, is provided with conductor tracks 15 for the fixing and wiring of components 16 for actuation of a liquid crystal cell 17 and light sources 18. The light sources 18 radiate light into a light-guide panel 19 from which, transversely with respect to the main plane thereof, the light passes in the opposite direction to the viewing direction 13 through the liquid crystal cell 17 which is disposed in front of the light-guide panel on the viewing side in order to be able to see the instantaneous symbol representation on the display module in a high-contrast fashion. For intensive but diffuse irradiation of light into the cell 17 the coupling-out surface of the panel 19, which is adjacent to the cell 17, is roughened, this preferably already being effected by suitable profiling of the injection-molding mold or otherwise only subsequently for example by sand blasting or by coating with rough lacquer or with a rough film or foil. The other surfaces of the light-guide panel 19 are as smooth as possible and preferably polished because that gives the best properties in regard to the desired total reflection for light conduction over the entire surface area of the panel 19.

To provide for trans-illumination of the liquid crystal cell 17, which is as uniformly bright as possible, over the entire display surface area thereof, and therefore in order to increase the light yield, the light-guide panel 19 is backed by a reflector 20 in opposite relationship to the roughened radiation-emission surface. In general for the sandwich structure and specifically for mounting the light-guide panel 19 on the circuit board 12, the reflector 20 is in the form of a bottom 21 of a shallow trough-shaped reflector member 22, between the peripherally extending side walls 23 of which the light-guide panel 19 is held. That trough-shaped member 22 for the reflector 20 is an injection molding of a material with a high proportion of white pigment and is thus highly reflective. Formed on the end walls thereof at the outside thereof are spring arms 24 which are oriented transversely with respect to the viewing direction 13 with support feet 25 at the free ends thereof in order to resiliently support a trough-shaped member 22 on a surface 26 of the board 12. The trough-shaped member 22 is fixed in position on the board 12 by cross pins 45 which project in the viewing direction 13 under the bottom 21 of the trough-shaped member 22, being formed thereon, and which engage into positioning and holding holes in the circuit board 12.

The height of the side walls 23 of the trough-shaped reflector member 22 projects slightly beyond the thickness of the light-guide panel 19 so that, in spite of inevitable production clearances, over the entire area, a thin air gap is guaranteed between the light-guide panel 19 and the liquid crystal cell 17 when the latter is laid on to the free end edge of the walls 23. The cell 17 is laterally held in position by support hooks which project elastically from the trough-shaped member 22 and which are formed on two trough member walls 23 extending in angular relationship with each other and which snap over the side edges of the cell 17 when it is pressed on to the trough-shaped reflector member 22. In that way the oppositely disposed sides of the cell 17 are pressed against abutments on the trough-shaped member 22 in order in that way to force-lockingly fix the cell 17.

The sandwich structure is fixed in position axially, that is to say in a direction oriented transversely with respect thereto in the viewing direction 13, by a frame 27 which extends therearound in a wide hood-like configuration and having a viewing opening 30, below which a receiving device 28 extends therearound in a stepped configuration for the periphery of the liquid crystal cell 17, at the viewing side. The frame 27 is fitted over the trough-shaped reflector member 22 which is already placed on to the circuit board 12, with the liquid crystal cell 17 resting on the member 22, and is latched with spring noses 29 which are formed on the frame 27 and which deflect transversely with respect to the viewing direction 13, into positioning and holding openings in the circuit board 12. In that situation the spring arms 24 press the sandwich structure formed of the trough-shaped member 22 and the liquid crystal cell 17 positioned thereon from below, that is to say in the opposite direction to the viewing direction 13, into the receiving device 28, so that the bottom 21 of the trough-shaped member 22 is lifted slightly from the surface of the circuit board 12 in the opposite direction to the viewing direction 13. In that way the height of the module is clearly defined by the height of the frame 27 and the anchorage thereof in the circuit board 12.

At the viewing side the frame 27 is provided with a soft-elastic seal 31 which projects and extends around the central viewing opening 30 and which is for example stamped out of a foam rubber mat. In that way the sandwich structure is dust-tightly and vibration-proofly pressed against the rear side of the surroundings of a viewing window in the operating panel (not shown in the drawing) of a large domestic appliance such as a washing machine, a drier or a dishwasher, when the display module 11 is inserted, for example with holding tongues formed in projecting relationship laterally on the frame 27, between holding bars which are formed on the operating panel at the rear thereof. As diagrammatically illustrated, the seal 31 can be in the form of a separately produced member which is glued into a groove extending in the frame 27 at the periphery thereof on the viewing side. To provide the sealing integrity to prevent the viewing window in the operating panel from becoming soiled from the rear, it is however easier from the production engineering point of view not to have to glue in position as an extra operation a part which is not mechanically stable and which has to be prepared separately with a large amount of waste, but rather to form sealing lips which have a corresponding effect directly on the plastic frame 27 in a position of projecting in the area around the viewing opening 30 thereof. It will be noted however that the sealing function requires a much softer material than the hood frame 27 itself, which determines the height of the module, and for that reason the frame 27 and the seal 31 cannot be homogeneously injection-molded. Instead, it can be provided that the frame 27 when it has already been injection-molded is transported in the form of an insert member into another tool and there the lip-shaped flexurally soft seal 31 is injection-molded on to it. Alternatively thereto however, a development in accordance with the present invention provides for implementing the two-cavity injection-molding procedure which is known as such and which provides that the specially softer material for the elastomer sealing lip is injection-molded on to the injection-molding material of the frame 27, in an adjacent tool cavity, by a second injection-molding unit. The tool costs that are higher in comparison with separate manufacture are justified not just in mass production, especially as the operation of gluing the unstable foam rubber seal 31 in place, which is susceptible to problems and difficulties from the technological and production-engineering point of view, is eliminated.

Electrical actuation of the display segments in the liquid crystal cell 17 from the conductor tracks 15 at the rear side 14 of the circuit board 12 is effected by connecting pins 32 which are anchored at one side of the liquid crystal cell 17. In the sandwich assembly the connecting pins 32 enjoy lateral guidance in a wave-shaped profiling 33 on the outward side of the associated side wall 23 of the trough-shaped reflector member 22, as can be seen in FIG. 1 directly above the circuit board 12. Such a guidance effect facilitates assembly fitment because the cell 17 with its pins 32 can now initially be caused to bear laterally against the profiling 33 and can then be moved downwardly until the holding tongues snap laterally on to the trough-shaped reflector member 22. In that situation the pins 32 engage transversely with respect to the main plane of the liquid cell 17 and thus parallel to the viewing direction 13 laterally past the trough-shaped reflector member 22, and engage into through holes in the circuit board 12, in order there to be electrically and mechanically connected at the rear to the conductor tracks 15 in a soldering procedure.

Usually, to pass light through the cell 17, the light sources 18 emit light into an end edge of the flat light-guide panel 19 in substantially parallel relationship to the main plane thereof and emit scatter light transversely thereto by way of the coupling-out surface, as has already been explained in the opening part of this specification. The present configuration of the light-guide panel 19 on the reflector 20 within the side walls 23, which are also reflective, of the trough-shaped reflector member 22 enhances the light yield when light is shone rearwardly through the liquid crystal cell 17. It will be noted that, for the light to be passed laterally into the panel 19, it is necessary for the light sources 18 to be mounted beside the light-guide panel 19 on the front side of the circuit board 12 and thus in opposite relationship to the rest of the components 16. This increases the base surface area of the module and increases the costs because of the circuit board 12 which has to be through-contacted and also represents a considerable increase in expenditure, in terms of production engineering, in comparison with SMD-mounting on a circuit board 12 which is lined only on one side. In order to be able to implement that preferred fitment assembly procedure even in the case of the present display module 11, the light-guide panel 19 at one of the narrow sides thereof, in accordance with the invention, terminates in a limb 36 which ultimately is angled parallel to the viewing direction 13. The limb 36 projects with its free end through a rectangular aperture 34 in the trough bottom 31 on to an aperture 35, which is disposed precisely therebeneath, in the circuit board 12, and possibly also extends into the well-shaped aperture 35. The light source 18 is held therebeneath, in or behind the aperture 35, under the rear side 14 of the circuit board 12, insofar as the light source 18 is soldered with its connecting wires 37, transversely to the longitudinal direction of the aperture 35, on to the conductor tracks 15. In that way a plurality of light sources 18 can be mounted in mutually juxtaposed relationship along the aperture 35 (or, as shown in FIG. 1, at bottom left, along a mutually adjacent sequence of such apertures 35—35), in order to achieve a particularly intensive and uniform through-flux of light in the panel 19.

The light source 18 which is mounted behind the circuit board 12 preferably involves what is known as a Reverse-Mount-LED, as is known as such for example from the journal DESIGN & ELEKTRONIK, Issue 06/2002, page 25—there for irradiation directly directed in opposite relationship to the viewing direction of the display through a light guide into the liquid crystal cell which however as a result is subjected to light irradiation over its viewing surface with widely differing levels of intensity.

In order as far as possible to avoid light losses in a transitional region 39, which is arcuate or which extends in a correspondingly multiply angled configuration, from the limb 34 into the large-area light-guide panel 19 which extends parallel to the liquid crystal cell 17 and thus transversely with respect to the viewing direction 13, the trough-shaped reflector member 22, besides the aperture 34, which is parallel to the wall, in the bottom 21 of the trough-shaped member, has a reflector wall 38 which extends in suitably inclined relationship with the angled transitional region 39, towards the limb 36. So that the light-guide panel 19 bears with its edge region 39 which is angled in relation to the limb 36 against the reflector wall 38 with as little gap as possible over a large area, in the interests of affording good reflection properties, provided between the oppositely disposed narrow side wall 23 of the trough-shaped reflector member 22 and the light-guide panel 19 is a spring element 40 which acts transversely with respect to the viewing direction 13.

Figure 2:
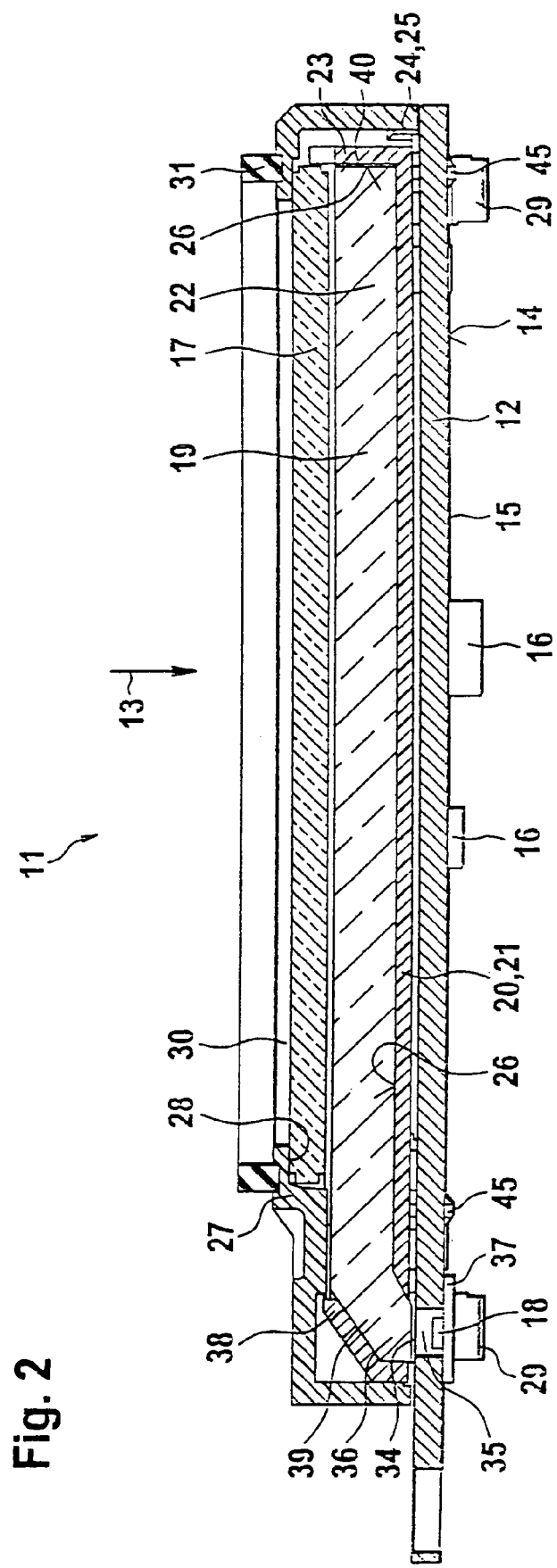
FIG. 2 is a vertical longitudinal section of the liquid crystal display module produced as shown in FIG. 1.

This can involve an inserted piece of rubber, but it is easier from the point of view of assembly procedure for the spring element to involve a small spring arm which is injection-molded to the end wall 23 at the inside thereof and which, with a prestressing transversely with respect to the viewing direction 13, bears resiliently against the adjacent end edge of the light-guide panel 19. The region of the coupling-out surface on the light-guide panel 19, which region is not occupied by the liquid crystal cell 17, is covered by the profiled frame 27 which is suitably stepped at its rear, to avoid radiation emission losses, as is shown in FIG. 2, beside the inclined reflector wall 38. In that respect however the rear stepping of the frame 27, contrary to the view shown in the illustrated example, can also extend on to the region and the function of the inclined reflector wall 38.

In the state of the art, problems regularly arise in regard to the installation dimensions for the display module 11, which are structurally predetermined behind the operating panel, by virtue of the fluctuating structural height thereof between the rear side 14 of the circuit board 12 and the viewing-side front of the frame 27 (without having regard to the soft seal 31 which projects thereover), in consideration of the thickness tolerances of the individual components of a sandwich structure of the described kind. It is therefore provided that, for mechanically holding the module 11, the projecting retaining clips or plugging ribs 46 which have already been mentioned above are formed on the frame 27 at a defined height below the viewing opening 30 directly laterally on the frame, but the electrical connection is not also to be rigidly predetermined, but is to be implemented by way of a flexible cable with a multi-plug device to contacts 42 which are applied by a lamination procedure to the projecting circuit board edge 41.

At any event in accordance with the invention, in the case of the module 11 of a back-lit liquid crystal display, as is involved in particular in the operating panel of a large domestic appliance, this provides a structure which is simple from the production procedure point of view, which is spatially compact and which has close tolerances in regard to the installation dimensions, with good illumination of the transmissive liquid crystal cell 17 when for that purpose the light-guide panel 19 is disposed in a trough-shaped reflector member 22 and the liquid crystal cell 17 is disposed at a small spacing relative to the coupling-out surface of the panel 19 on the side walls 23 of the trough-shaped member 22.

By specifically departing from the common structure which is clearance-free in relation to the circuit board, the frame 27 which engages over the configuration in a hood-like configuration now determines the height of the module, in regard to its positively locking anchorage in the circuit board 12 on which the trough-shaped reflector member 22 now resiliently rests. The springs 24 on the reflector 21 press the circuit board (circuit card) against the latching device of the spring arms 29 on the frame 27 and thereby compensate for the individual thickness tolerances in the sandwich structure.

In order to avoid mechanically loading the solder joins of the pins 32 for electrical actuation of the liquid crystal cell 17 upon installation of the module 12 between the operating panel and the printed circuit board 12 and as a consequence of vibration in operation of the machine, the module assembly procedure is implemented not by the circuit board (circuit card) 12 but by plug ribs or latching hooks which are formed externally on the frame 27.

In addition, irradiation of light into the light-guide panel 19 is effected in opposite relationship to the viewing direction 13 from the SMD-equipped rear side 14 of the circuit board 12 through at least one aperture 35 in the circuit board 12 and through an aperture 34, disposed thereabove, in the reflector 21, by way of the limb 36 which extends downwardly in an angled position with respect to the main plane of the light-guide panel 19 in the viewing direction 13.

I claim:

1. A back-lit liquid crystal display, comprising:
    a frame having spring noses;
    a circuit board having conductor tracks;
    a liquid crystal cell disposed under said frame and electrically and mechanically connected to said circuit board;
    a light-guide panel having a light passing there-through transversely with respect to a viewing direction and disposed under said liquid crystal cell;
    a trough-shaped reflector member accommodating said light-guide panel and at a small spacing above said light-guide panel carrying said liquid crystal cell, said trough-shaped reflector member having a bottom with a slot-shaped aperture formed therein;
    a light source, electrically and mechanically connected to said conductor tracks of said circuit board, radiates the light laterally into said light-guide panel;
    said frame, said circuit board, said liquid crystal cell,
    said light-guide panel, said light source, and said trough-shaped reflector member forming a modular structure defining a display module for use behind an operating panel of a domestic appliance;
    said trough-shaped reflector member resting in an elastically supported relationship on said circuit board;
    said frame being a cover-shaped frame determining a structural height of the display module;
    said light-guide panel having an angularly extending limb engaging into said slot-shaped aperture;
    said circuit board having at least one aperture formed therein beneath said slot-shaped aperture, said light source being disposed in or under said aperture and radiating the light into said angularly extending limb, said light source connected to said conductor tracks on a rear side of said circuit board, remote from said frame; and
    said frame rigidly latched with said spring noses in opposite relationship to elastic support of said trough-shaped reflector member.

2. The liquid crystal display according to claim 1,
    wherein said light-guide panel has a region of an angled configuration in relation to said limb; and
    further comprising an inclinedly extending reflector wall occupying said region.

3. The liquid crystal display according to claim 2, wherein said inclinedly extending reflector wall is part of one of said trough-shaped reflector member and said frame.

4. The liquid crystal display according to claim 2, wherein said light-guide panel is pressed elastically against said inclinedly extending reflector wall in a direction of a main plane of said light-guide panel.

5. The liquid crystal display according to claim 1,
    wherein said frame has a viewing opening formed therein above said liquid crystal cell; and
    further comprising a soft-elastic seal surrounding said viewing opening in an upstanding relationship.

6. The liquid crystal display according to claim 5, wherein said soft-elastic seal is injection-molded in one piece with said frame but from a softer plastic material in relation thereto.

7. The liquid crystal display according to claim 1, wherein said light source is at least one light emitting diode connected on said rear side of said circuit board which is lined on one side, in a surface mounted fashion.

8. The liquid crystal display according to claim 1, wherein said trough-shaped reflector member has side walls holding said liquid crystal cell, said side walls project beyond a thickness of said light-guide panel.

9. The liquid crystal display according to claim 1, wherein said trough-shaped reflector member has spring arms which deflect in the viewing direction, for elastically bearing against said circuit board.

10. The liquid crystal display according to claim 1,
wherein said liquid crystal cell has connecting pins; and
further comprising profiling devices provided over said circuit board for longitudinal guidance of said connecting pins on said liquid crystal cell.

* * * * *